United States Patent
Lindop et al.

(10) Patent No.: US 8,122,414 B1
(45) Date of Patent: Feb. 21, 2012

(54) PLACEHOLDER-BASED DESIGN FLOW FOR CREATING CIRCUIT DESIGNS FOR INTEGRATED CIRCUITS

(75) Inventors: Nathan A. Lindop, Musselburgh (GB); Brian Cotter, Tranent (GB); Scott Leishman, Edinburgh (GB); Martin Sinclair, Eskbank (GB)

(73) Assignee: Xilinx, Inc., San Jose, CA (US)

( * ) Notice: Subject to any disclaimer, the term of this patent is extended or adjusted under 35 U.S.C. 154(b) by 323 days.

(21) Appl. No.: 12/569,497

(22) Filed: Sep. 29, 2009

(51) Int. Cl.
*G06F 17/50* (2006.01)
(52) U.S. Cl. ........................................ 716/118; 716/119
(58) Field of Classification Search .................. 716/118, 716/119
See application file for complete search history.

(56) References Cited

U.S. PATENT DOCUMENTS

| 7,640,526 B1 * | 12/2009 | Blodget et al. ................ 716/138 |
| 2004/0230934 A1 * | 11/2004 | Taylor et al. .................... 716/17 |
| 2008/0077906 A1 * | 3/2008 | Bowyer et al. .................. 716/18 |

* cited by examiner

*Primary Examiner* — Jack Chiang
*Assistant Examiner* — Magid Dimyan
(74) *Attorney, Agent, or Firm* — Kevin T. Cuenot; Lois D. Cartier (57) ABSTRACT

Within a system comprising a processor and a memory, a method of creating a circuit design for implementation within an integrated circuit can include inserting a placeholder block into the circuit design, wherein the circuit design includes a circuit block comprising circuitry and a circuit block interface, and wherein the placeholder block is devoid of circuitry and, responsive to receiving a user input specifying a coupling between the placeholder block and the circuit block, automatically determining a plurality of attributes of the circuit block interface. The method can include automatically generating, according to the attributes and by the processor, a placeholder interface within the placeholder block, wherein the placeholder interface is complementary to the circuit block interface. The placeholder block can be stored within the memory.

17 Claims, 3 Drawing Sheets

PLACEHOLDER-BASED DESIGN FLOW FOR CREATING CIRCUIT DESIGNS FOR INTEGRATED CIRCUITS

FIELD OF THE INVENTION

The embodiments disclosed herein relate to implementing circuit designs for integrated circuit devices (ICs). More particularly, the embodiments relate to a design flow that utilizes placeholders when creating a circuit design for implementation within an IC.

BACKGROUND

A High-Level Modeling System (HLMS) refers to a computer-based circuit design tool that allows circuit designers to create circuits at a high level of abstraction. Typically, an HLMS provides a graphic design environment within which circuit designers can create circuit designs using a "drag-and-drop" design paradigm. A circuit designer can drag graphic blocks, where each graphic block represents a particular circuit function, into the design environment. For example, each graphic block can represent a function such as multiplexing, addition, multiplication, filtering, or the like. Within the design environment, the circuit designer also can specify connectivity among the graphic blocks, e.g., draw links, to indicate connectivity and signal flows within the circuit design.

One example of an HLMS is the Xilinx System Generator for Digital Signal Processing (DSP), also known as "SysGen." SysGen is a high-performance, computer-based design tool that executes as part of Simulink to provide a high-level, graphical modeling environment. Simulink runs in Matlab from The Math Works, Inc., of Natick, Mass. and is an interactive tool for modeling, simulating, and analyzing dynamical systems.

When a circuit designer creates a module as part of a new circuit design, the circuit designer must specify that module using a hardware description language (HDL). Aspects of the module, such as the interface, must be specified manually. The interface of the module must match the interface of each other module of the circuit design to which the newly created module is coupled. Specifying the interface of a module, being manual in nature, is often an error prone and tedious task. Several revisions of the interface may be required before the newly created module compiles correctly and, therefore, can be integrated into the circuit design and represented within the HLMS.

SUMMARY

The embodiments disclosed within this specification relate to creating a circuit design for implementation within an integrated circuit device (IC). More particularly, the embodiments relate to a design flow that utilizes placeholders when creating a circuit design for an IC. One embodiment of the present invention can include, within a system comprising a processor and a memory, a method of creating a circuit design for implementation within an integrated circuit. The method can include inserting a placeholder block into the circuit design, wherein the circuit design comprises at least one circuit block comprising circuitry and a circuit block interface, and wherein the placeholder block is devoid of circuitry and, responsive to receiving a user input specifying a coupling between the placeholder block and the at least one circuit block, automatically determining a plurality of attributes of the circuit block interface. The method can include automatically generating, according to the attributes and by the processor, a placeholder interface within the placeholder block, wherein the placeholder interface is complementary to the circuit block interface. The placeholder block can be stored within the memory.

Automatically determining a plurality of attributes of the circuit block interface can include determining ports of the circuit block interface, a width of each port of the circuit block interface, and/or a directionality of each port of the circuit block interface.

Automatically generating, according to the attributes, a placeholder interface within the placeholder block can include automatically generating a module declaration specifying each port of the placeholder interface, a direction of each port, and a width of each port.

The method can include automatically adding an instance of an adapter block within the placeholder block, wherein the adapter block includes an adapter interface that is coupled to the placeholder interface and generating a user block within the placeholder block, wherein the user block includes an interface that is complementary to the adapter interface. The user block is reserved for receiving user-specified circuitry. The adapter block can be coupled to the user block.

The method also can include determining whether the adapter block includes at least one user-specifiable implementation option and, when the adapter block includes at least one user-specifiable implementation option, automatically displaying a configuration wizard that receives the user-specifiable implementation option(s).

Prior to automatically adding the instance of the adapter block, the method can include determining whether the placeholder interface is compatible with an available adapter block. Further, responsive to determining that an adapter block is available that is compatible with the placeholder interface, a notification of the availability of the adapter block can be output.

Another embodiment of the present invention can include a system for implementing a circuit design for an integrated circuit. The system can include a memory storing program code and a processor coupled to the memory, wherein the processor, upon executing the program code, performs a plurality of operations. The operations can include inserting a placeholder block into the circuit design, wherein the circuit design comprises at least one circuit block comprising circuitry and a circuit block interface, and wherein the placeholder block is devoid of circuitry. Responsive to receiving a user input specifying a coupling between the placeholder block and the at least one circuit block, a plurality of attributes of the circuit block interface can be automatically determined. A placeholder interface can be automatically generated within the placeholder block according to the attributes. The placeholder interface is complementary to the circuit block interface. The placeholder block can be stored within the memory.

Automatically generating, according to the attributes, a placeholder interface within the placeholder block can include automatically generating a module declaration specifying each port of the placeholder interface, a direction of each port, and a width of each port.

The processor further can perform the operations of automatically adding an instance of an adapter block within the placeholder block, wherein the adapter block comprises an adapter interface that is coupled to the placeholder interface, generating a user block within the placeholder block, wherein the user block comprises an interface that is complementary to the adapter interface, wherein the user block is reserved for receiving user-specified circuitry, and coupling the adaptor block to the user block.

Another embodiment of the present invention can include a device including a data storage device usable by a system comprising a processor and a memory. The data storage device stores program code that, when executed by the system, causes the system to perform executable operations. The executable operations can include inserting a placeholder block into the circuit design, wherein the circuit design comprises at least one circuit block comprising circuitry and a circuit block interface, and wherein the placeholder block is devoid of circuitry. Responsive to receiving a user input specifying a coupling between the placeholder block and the circuit block, a plurality of attributes of the circuit block interface can automatically be determined. A placeholder interface that is complementary to the circuit block interface can be automatically generated according to the attributes within the placeholder block and the placeholder block can be stored within the memory.

Automatically determining a plurality of attributes of the circuit block interface can include determining ports of the circuit block interface, determining a width of each port of the circuit block interface, and/or determining a directionality of each port of the circuit block interface.

Automatically generating, according to the attributes, a placeholder interface within the placeholder block can include automatically generating a module declaration specifying each port of the placeholder interface, a direction of each port, and a width of each port.

The data storage device further can cause the system to perform the operations of automatically adding an instance of an adapter block within the placeholder block, wherein the adapter block comprises an adapter interface that is coupled to the placeholder interface, generating a user block within the placeholder block, wherein the user block comprises an interface that is complementary to the adapter interface, wherein the user block is reserved for receiving user-specified circuitry, and coupling the adaptor block to the user block.

The data storage device further can cause the system to perform the operations of, prior to automatically adding the instance of the adapter block, determining whether the placeholder interface is compatible with an available adapter block, and/or, responsive to determining that an adapter block is available that is compatible with the placeholder interface, outputting a notification of the availability of the adapter block.

DETAILED DESCRIPTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the embodiments of the invention.

The embodiments disclosed within this specification relate to creating a library component for use within a circuit design for implementation within an integrated circuit (IC). In accordance with the embodiments disclosed herein, a placeholder block can be created and inserted into a circuit design. The placeholder block can be coupled to one or more other circuit blocks of the circuit design within a design environment of a computer-based design tool. As its name suggests, the placeholder block can serve as a placeholder into which a circuit description, e.g., user-specified logic and/or circuitry, is inserted at a future point in time.

Accordingly, when first inserted into the circuit design, the placeholder block does not specify or include any circuit description. Connectivity for the placeholder block with one or more other circuit blocks can be specified after insertion of the placeholder block into the circuit design within the design environment. Once connectivity is specified, interfaces of those circuit blocks that are coupled to the placeholder block can be analyzed. An interface of the placeholder block can be automatically inferred and/or generated based upon the interface(s) of those circuit blocks that are coupled to the placeholder block.

The embodiments disclosed within this specification allow a circuit designer to more completely specify a circuit architecture since placeholder blocks can be inserted into a circuit design to join other, already specified, circuit blocks together. A user-specified circuit description can be inserted into the placeholder block when the circuit designer is ready to do so. For example, after creating an architecture for the circuit design using existing circuit blocks and placeholder blocks, the circuit designer can create and insert circuit description into the various placeholder blocks.

Conventional circuit development tools permit a circuit block to be created within a design environment, e.g., one provided by a High Level Modeling System (HLMS), from an existing hardware description language (HDL) circuit description. This means that the circuit designer must first create an HDL module. Once created, the HDL module must be correlated with a circuit block in the design tool. The embodiments disclosed within this specification allow a placeholder block to be created and represented within the design environment of a design tool without the circuit designer first having to provide HDL-based circuit description for the placeholder block. Rather, the design tool can automatically generate portions of the HDL circuit description corresponding to the placeholder block based upon the connectivity of the placeholder block to other circuit blocks of the circuit design as specified within the design environment of the design tool.

Figure 1:
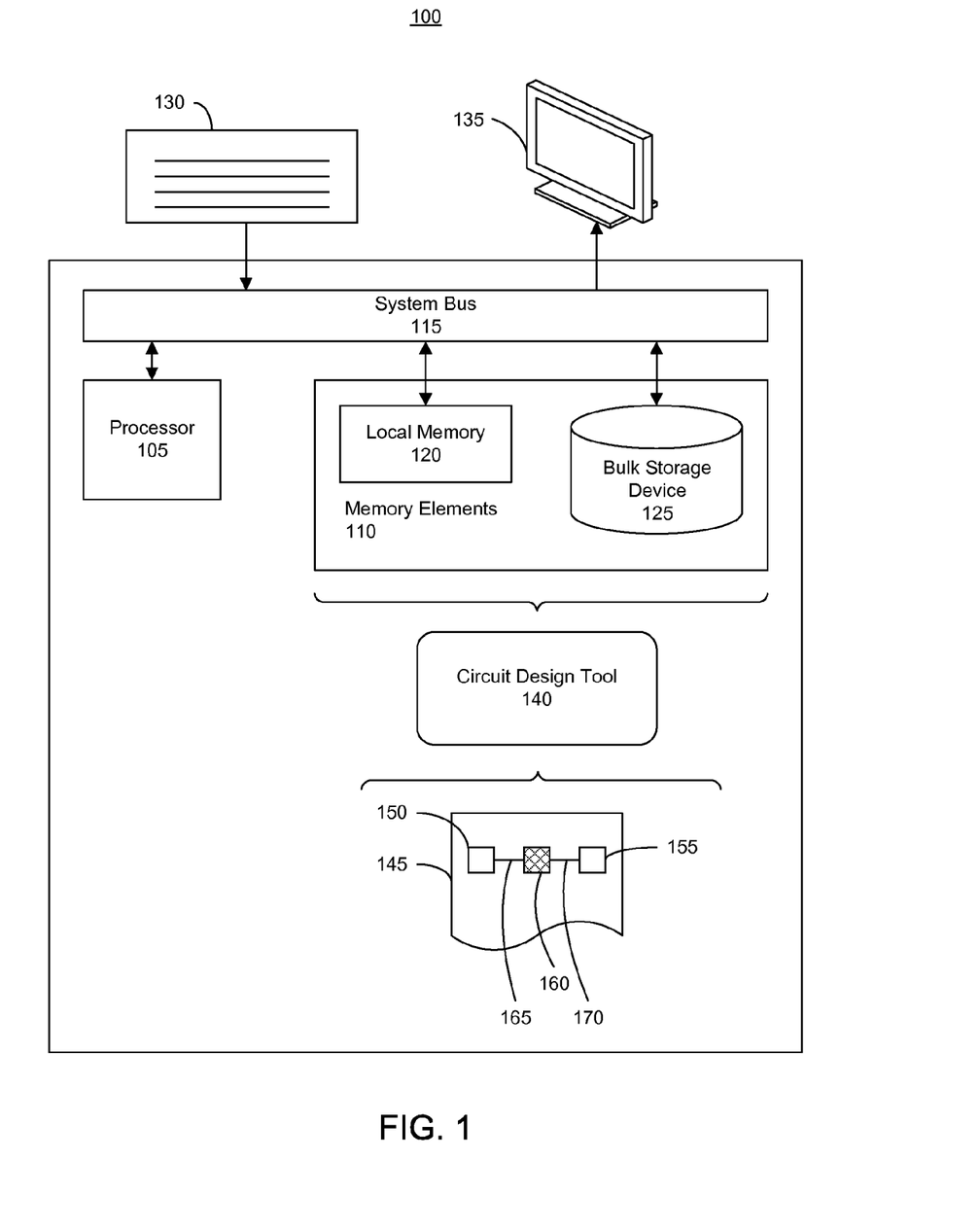
FIG. 1 is a first block diagram illustrating a system for creating a circuit design for implementation within an integrated circuit device (IC) in accordance with one embodiment of the present invention.

FIG. 1 is a first block diagram illustrating a system 100 for creating a circuit design for implementation within an IC in accordance with one embodiment of the present invention. In one aspect, system 100 can implement a circuit design for instantiation, or implementation, within a programmable IC. Programmable ICs are a well-known type of integrated circuit that can be programmed to perform specified logic functions. Examples of programmable ICs can include, but are not limited to, field programmable gate arrays (FPGAs), complex programmable logic devices (CPLDs), and mask programmable devices. The phrase "programmable IC" refers to the ICs noted herein as well as ICs that are only partially programmable. For example, another type of programmable IC includes a combination of hard-coded transistor logic and a programmable switch fabric that programmably interconnects the hard-coded transistor logic.

System 100 can include at least one processor 105 coupled to memory elements 110 through a system bus 115. As such, system 100 can store program code within memory elements 110. Processor 105 can execute the program code accessed from memory elements 110 via system bus 115. In one aspect, for example, system 100 can be implemented as a computer that is suitable for storing and/or executing program code. It should be appreciated, however, that system 100 can be implemented in the form of any system comprising a processor and memory that is capable of performing the functions described within this specification.

Memory elements 110 can include one or more physical memory devices such as, for example, local memory 120 and one or more bulk storage devices 125. Local memory 120 refers to random access memory or other non-persistent memory device(s) generally used during actual execution of the program code. Bulk storage device(s) 125 can be implemented as a hard drive or other persistent data storage device. System 100 also can include one or more cache memories (not shown) that provide temporary storage of at least some program code in order to reduce the number of times program code must be retrieved from bulk storage device 125 during execution.

Input/output (I/O) devices such as a keyboard 130, a display 135, and a pointing device (not shown) optionally can be coupled to system 100. The I/O devices can be coupled to system 100 either directly or through intervening I/O controllers. Network adapters also can be coupled to system 100 to enable system 100 to become coupled to other computer systems, remote printers, and/or remote storage devices through intervening private or public networks. Modems, cable modems, and Ethernet cards are examples of different types of network adapters that can be used with system 100.

As shown, memory elements 110 of system 100 can store a circuit design tool (design tool) 140. Design tool 140 can be implemented in the form of program code that, when executed by system 100, facilitates creation of a circuit design for implementation within an IC. In one embodiment, design tool 140 can be an HLMS. As noted, an HLMS provides a design environment, whether graphical, text-based, or command line driven, within which circuit designers can create circuit designs by coupling various circuit blocks that represent different circuit functions.

In operation, system 100, executing design tool 140, processes a circuit design 145. Circuit design 145 is a programmatic description of a circuit for implementation within an IC. While circuit design 145 can be specified in an HDL such as Verilog or VHDL, circuit design 145 also can be specified using other types of high level languages such as SystemC or the like. The particular language used to specify circuit design 145 is not intended as a limitation of the embodiments described within this specification. Accordingly, while the term "HDL" will be used throughout this specification by way of example, it should be appreciated that other languages capable of specifying hardware, or being synthesized into hardware, can be used.

Circuit design 145 can include a plurality of circuit blocks 150 and 155. For example, each of circuit blocks 150 and 155 can be intellectual property (IP) blocks within a library of such IP blocks available to, or within, design tool 140. Each of circuit blocks 150 and 155 includes a programmatic description of circuitry, e.g., a sub-circuit of the larger circuit design 145. For example, each of circuit blocks 150 and 155 can correspond to, or represent an HDL circuit description or module. While not shown, each of circuit blocks 150 and 155 also can include, or reference, an interface that is specified in the applicable HDL.

In this regard, a circuit block is said to specify or include circuitry when that circuit block includes, or is programmatically associated with, either a defined interface or a programmatic description of the circuit functions that is synthesizable into actual circuitry within an IC. Accordingly, a circuit block that does not include circuitry, e.g., is devoid of circuitry, does not include or is not programmatically associated with a defined interface or a programmatic description of circuit functions.

Design tool 140, under the control of a circuit designer, inserts a placeholder block 160 into circuit design 145 within the design environment. Placeholder block 160 can be a new circuit block that does not include any circuitry. In one aspect, placeholder block 160 can have an undefined interface. Placeholder block 160 can be inserted between each of circuit blocks 150 and 155. Further user input can be received that indicates that placeholder block 160 is coupled to each of circuit blocks 150 and 155. Connectivity between placeholder block 160 and circuit blocks 150 and 155 is pictured in FIG. 1 in the form of signals 165 and 170.

Once connectivity of placeholder block 160 is specified, design tool 140 can begin an automated process of inferring interfaces of placeholder block 160. More particularly, design tool 140 can analyze connectivity between placeholder block 160 and other circuit blocks, i.e., circuit blocks 150 and 155, of circuit design 145. Design tool 140 automatically generates an interface for placeholder block 160 that is complementary to each of the interfaces of circuit blocks 150 and 155. For example, design tool 140 can generate an HDL module declaration for placeholder block 160 and output the HDL module. As used herein, "outputting" and/or "output" can mean storing in memory elements 110, e.g., writing to a file stored in memory elements 110, writing to display 135 or other peripheral output device, sending or transmitting to another system, exporting, or the like.

Further, any supporting data files necessary for use of placeholder block 160 within design tool 140, e.g., as a library component, can be created, stored in memory, and associated with placeholder block 160. The particular type of files to be created, stored, and associated with placeholder block 160 will depend upon the particular tool used to perform synthesis. Design tool 140 can output files needed by any of a variety of different synthesis tools. Examples of files that can be generated and output can include, but are not limited to, a top-level HDL interface to describe ports, buses, bus interfaces, and the like, as well as one or more meta-data files that describe the placeholder block 160. The meta-data file or files can specify, for example, the author of the placeholder block 160, the name of the placeholder block 160, the purpose of the placeholder block 160, etc.

The resulting placeholder block 160 is a new IP library module that includes information such as, for example, ports, interfaces, signal properties, and other attributes necessary to correctly incorporate placeholder block 160 within circuit design 145. The actual implementation of placeholder block 160, however, is left undefined or empty. Accordingly, support of placeholder block 160 by design tool 140 allows a user to create a syntactically correct and fully coupled circuit design, e.g., circuit design 145, that contains unimplemented components such as placeholder block 160. Because connectivity is properly specified, circuit design 145 can be processed through the implementation flow of design tool 140, e.g., mapping, placement, and routing, without error, despite the lack of circuitry within placeholder block 160.

Figure 2:
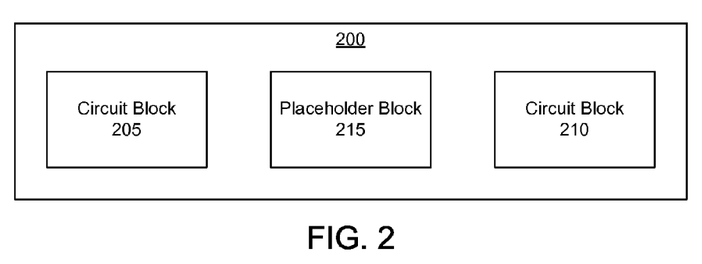
FIG. 2 is a second block diagram illustrating one aspect of a placeholder-based implementation flow in accordance with another embodiment of the present invention.

FIG. 2 is a second block diagram illustrating an aspect of a placeholder-based implementation flow in accordance with another embodiment of the present invention. FIG. 2 illustrates a portion of a circuit design 200 including circuit blocks 205 and 210. For purposes of illustration, it can be assumed that circuit design 200 has been loaded into a design tool of the variety discussed with reference to FIG. 1.

Responsive to a user input requesting creation of a placeholder block, the design tool creates a placeholder block 215 within circuit design 200 and can display placeholder block 215 within the graphic design environment as shown. It should be appreciated that while various ones of the figures described in this specification demonstrate graphical design environments, other types of design environments, e.g., non-graphical or command-line design environments, can be used to create and/or insert a placeholder block within a circuit design.

Regarding the example pictured in FIG. 2, consider the case where circuit block 205 is a Gigabit Ethernet Media Access Controller (GEMAC) core available from Xilinx, Inc. of San Jose, Calif. (Xilinx). Circuit block 210 can be an "Aurora" core, also available from Xilinx, that implements the Aurora protocol. The Aurora Protocol describes the transfer of user data across an Aurora channel having one or more lanes. Each Aurora lane is a full-duplex serial data coupling. The circuit designer wishes to couple circuit blocks 205 and 210 using some sort of first-in-first-out (FIFO) circuitry that has not yet been designed. Rather than stopping high-level development of circuit design 200 to develop HDL specifying aspects of the FIFO block, the circuit designer can request the insertion of placeholder block 215. The design tool can support the use, and insertion of, blocks that have an undefined interface, such as placeholder block 215, into circuit design 200.

Figure 3:
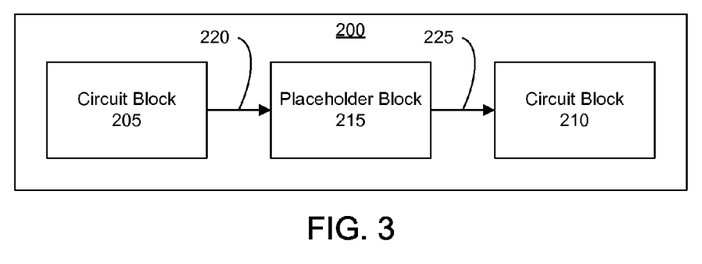
FIG. 3 is a third block diagram illustrating another aspect of the placeholder-based implementation flow in accordance with another embodiment of the present invention.

FIG. 3 is a third block diagram illustrating another aspect of the placeholder-based implementation flow in accordance with another embodiment of the present invention. FIG. 3 illustrates that once placeholder block 215 is inserted into circuit design 200, the circuit designer can provide input to the design tool specifying connectivity of placeholder block 215 to one or more other circuit blocks. Thus, the design tool supports, or allows, a block, such as placeholder block 215, to be coupled to one or more other circuit blocks such as circuit blocks 205 and 210. As pictured in FIG. 3, signal 220 illustrates that the circuit designer has indicated that placeholder block 215 is coupled to circuit block 205. Signal 225 illustrates that the circuit designer has indicated that placeholder block 215 is coupled to circuit block 210. For example, within the graphic design environment of the design tool, the circuit designer can draw signals 220 and 225.

Figure 4:
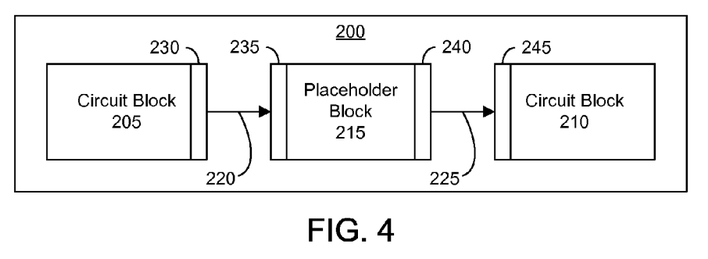
FIG. 4 is a fourth block diagram illustrating another aspect of the placeholder-based implementation flow in accordance with another embodiment of the present invention.

FIG. 4 is a fourth block diagram illustrating another aspect of the placeholder-based implementation flow in accordance with another embodiment of the present invention. FIG. 4 illustrates that once connectivity of placeholder block 215 is specified, the design tool automatically determines and generates the interface(s) needed to couple placeholder block 215 to each other circuit block coupled to placeholder block 215 as specified by the circuit designer. In the example pictured in FIG. 4, the design tool determines that placeholder block 215 is coupled to circuit blocks 205 and 210 as a consequence of signals 220 and 225 respectively.

Accordingly, the design tool determines that circuit block 205 includes an interface 230 that is used to communicate with placeholder block 215. Similarly, the design tool can determine that circuit block 210 includes an interface 245 that is used to communicate with placeholder block 215. In identifying each of interfaces 230 and 245, the design tool can determine the different attributes that define each of interfaces 230 and 245. For example, for each of interfaces 230 and 245, the design tool can identify attributes such as the number of ports, the signals within each port, the width of each signal, and thus port, directionality of each signal, and the like.

With the determined attributes for interfaces 230 and 245, the design tool can implement a suitable interface, or interfaces, for placeholder block 215. For example, the design tool can generate interface 235 and interface 240. Interface 235 can be complementary to interface 230. Similarly, interface 240 can be complementary to interface 245. Interfaces 235 and 240 can be associated with placeholder block 215.

In one embodiment, generating an interface for placeholder block 215 can include automatically generating a module in HDL, e.g., a shell module, that is associated with placeholder block 215 within the design tool. Generating a module in HDL can include automatically generating a declaration specifying the inputs and outputs for placeholder block 215. In this regard, the interfaces 235 and 240 can be said to be "inserted" into placeholder block 215 as each is created within the HDL module that is associated with placeholder block 215. As noted, placeholder block 215, as well as the HDL module corresponding to placeholder block 215, will not specify any circuitry other than the automatically generated interface(s).

In illustration, when circuit blocks 205, 210 and placeholder block 215 are specified in Verilog, for example, the basic design entity, or unit of design, is the module. As noted, when initially inserted into circuit design 200, placeholder block 215 lacks an interface and circuit description. The design tool can analyze the parameter list and input and output designations of the Verilog modules associated with circuit blocks 205 and 210. The design tool can automatically generate a Verilog shell module corresponding to placeholder block 215 by generating a declaration defining the module. Further, the design tool can generate the parameter list and the input and output designations for the generated module based upon the parameter list and input and output designations for each of circuit blocks 205 and 210. The interfaces 235 and 240 of placeholder block 215 will be complementary to the interfaces of circuit blocks 205 and 210 respectively.

In particular, a port defined as an output of circuit block 205 can be defined as an input of placeholder block 215. A bidirectional port of circuit block 205 can be defined as a bidirectional port of placeholder block 215. An input port of circuit block 205 can be defined as an output port of placeholder block 215. It should be appreciated that while placeholder block 215 is pictured as including two interfaces 235 and 240, that such interfaces can be specified through a single module statement, or a plurality of module statements. A similar process can be performed with respect to circuit block 210.

Though described using Verilog as the HDL, it also should be appreciated that a similar result can be obtained using VHDL. For example, the design tool can generate an entity declaration and the necessary port declarations for that entity in the same manner as described with reference to Verilog modules.

Figure 5:
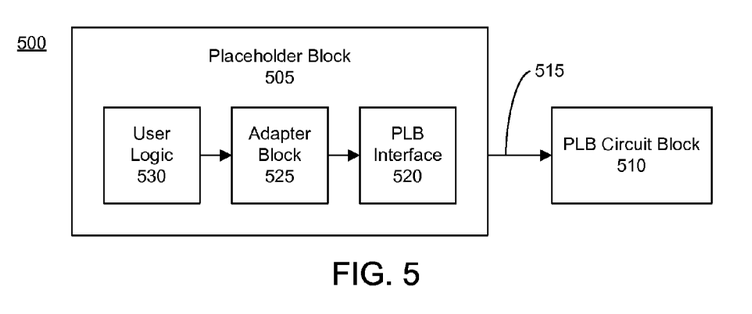
FIG. 5 is a fifth block diagram illustrating another aspect of the placeholder-based implementation flow in accordance with another embodiment of the present invention.

FIG. 5 is a fifth block diagram illustrating another aspect of the placeholder-based implementation flow in accordance with another embodiment of the present invention. FIG. 5 illustrates an optional aspect of the placeholder-based implementation flow in which an adapter block can be inserted into a placeholder block. In general, an adapter block is a block that implements the circuitry necessary to transmit information over a particular interface. Typically, the adapter block simplifies the interface by making a limited subset of the signals of the interface available to the user logic, thereby simplifying the task of coupling user logic with an interface. As used herein, the term "logic" is intended to refer to circuitry that may or may not include actual logic gates.

In the example pictured in FIG. 5, a placeholder block 505 has been inserted into a circuit design 500. As shown, the circuit designer has indicated that placeholder block 505 is coupled to a processor local bus (PLB) circuit block 510 via signal 515. PLB block 510 is an example of a circuit block that requires any circuit blocks coupled to PLB block 510 to include a relatively complex interface. Using the processes described within this specification, a PLB interface 520 is automatically generated and inserted into placeholder block 505.

An adapter block 525 can be inserted into placeholder block 505. Adapter block 525 specifies circuitry that allows a user-specified portion of a circuit design, in this case user logic 530, to couple with PLB interface 520. The circuitry specified by adapter block 525 exposes only a limited subset of the entire number of signals available within PLB interface 520 to user logic 530, thereby simplifying the connectivity of user logic 530 to PLB interface 520 and simplifying the signaling needed to initiate and/or respond to transactions between user logic 530 and PLB circuit block 510.

User logic 530, also referred to as a "user block," serves as a placeholder for receiving user-specified circuit description at some point in the future. For example, circuit description can be inserted into user logic 530 after the creation of placeholder block 505, PLB interface 520, and adapter block 525.

A non-exhaustive list of exemplary adapter blocks includes the set of IPIF cores available from Xilinx. In addition to reducing complexity of interfaces, whether for PLB circuit blocks, other buses, or the like, IPIF cores also can provide one or more functions that, if not included in the adapter block 525, would have to be implemented in user logic 530. For example, each slave of a bus, e.g., user logic 530, may need circuitry to determine whether the address of a request falls within the range corresponding to that slave. In another example, the width of the user logic can differ from the width of the bus to which the user logic couples. In other cases, functions such as bursting and direct memory access (DMA) are needed, but are not built into the bus specification.

Accordingly, an adapter block such as an IPIF core can perform functions including, but not limited to, address range checking, implementing user-defined registers, performing "byte steering" that allows devices to couple to buses that are wider than the device itself, interrupt handling with collection/latching, providing support for fixed length burst transfers, and reading from and/or writing to first-in-first-out (FIFO) memories. Some adapter blocks can include a DMA engine that is able to move data between a buffer and another device on the bus responsive to requests from user logic. These are a few of the different functions that can be performed by adapter block 525 that facilitate connectivity between user logic 530 and PLB interface 520.

Because adapter block 525 can be implemented as a parameterizable circuit block, in one embodiment, a configuration wizard can be executed automatically responsive to a user input to the design tool that requests insertion of an adapter block. Execution of the configuration wizard can depend upon the particular adapter block that is being inserted and the different parameters available for modification by the circuit designer.

After the circuit designer completes the configuration wizard, the design tool can add an instance of the appropriate adapter block, e.g., adapter block 525, into the HDL module corresponding to placeholder block 505. Placeholder block 505 illustrates a hierarchical arrangement in which a block such as user logic 530 is a nested placeholder block within placeholder block 505. The design tool can generate an additional HDL module that includes, and only implements, a simplified interface that is complementary to the interface of adapter block 525. The additional module including the simplified interface is the module that receives the user logic, e.g., user logic 530 in FIG. 5, when ultimately specified by the circuit designer. The design tool then can couple adapter block 525 with the additional module, corresponding to user logic 530.

Figure 6:
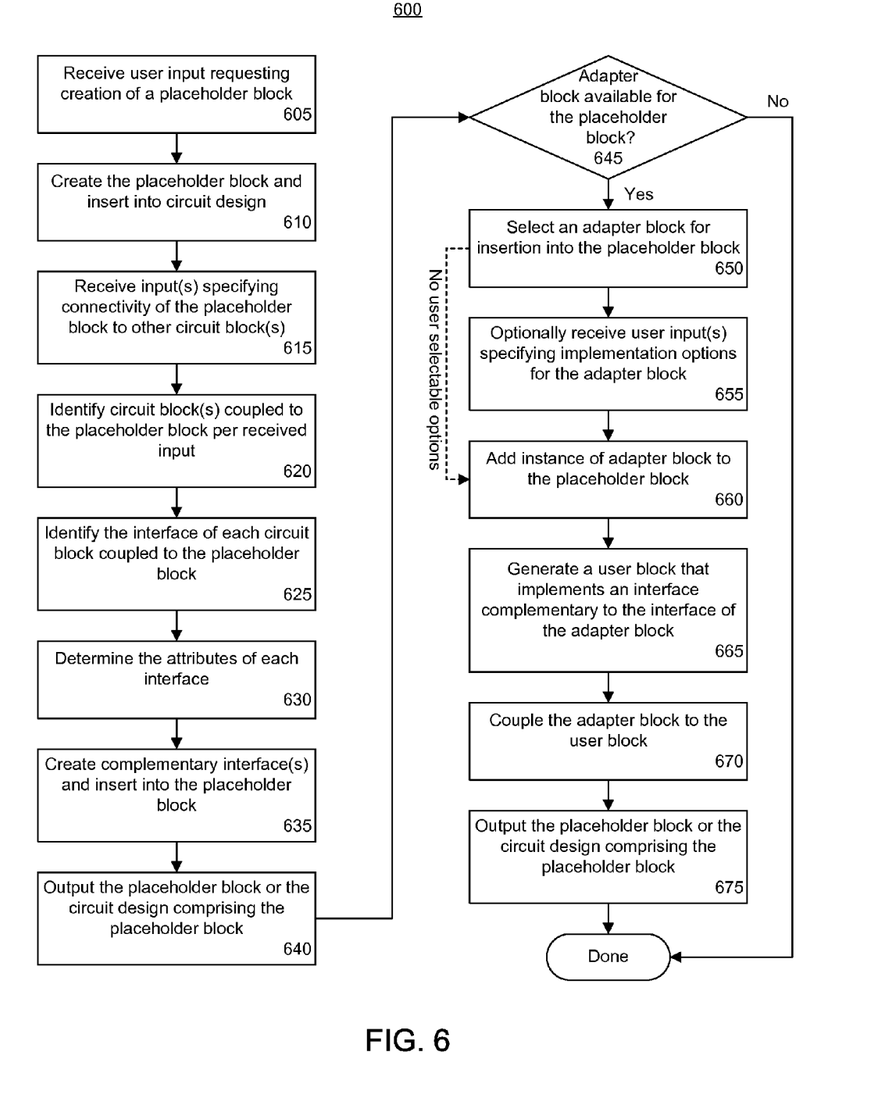
FIG. 6 is a flow chart illustrating a method of placeholder-based implementation flow in accordance with another embodiment of the present invention.

FIG. 6 is a flow chart illustrating a method 600 of placeholder-based implementation flow in accordance with another embodiment of the present invention. Method 600 can be performed by a system such as a design tool executing within a system comprising a processor and a memory as described with reference to FIGS. 1-5 of this specification. Method 600 can begin in a state where a circuit designer is engaged in the process of creating a circuit design using the design tool. It should be appreciated that within method 600, when a result is determined, created, generated, calculated, output, or the like, that the system, in performing that step, stores the result of the operation within memory.

Accordingly, in step 605, the system can receive a user input requesting creation of a placeholder block. In step 610, a placeholder block can be created and inserted into the circuit design. For example, a graphic element, e.g., a block, can be displayed within the design environment of the system. In step 615, the system can receive further user input(s) specifying connectivity of the placeholder block to one or more other circuit blocks within the circuit design that is being created or developed.

In step 620, the system can identify the circuit blocks coupled to the placeholder block based upon the user-specified connectivity received in step 615. In step 625, the system can identify the interface of each circuit block that is coupled to the placeholder block. In step 630, the system can determine the attributes of each interface identified in step 630. In step 635, the system can automatically generate one or more interfaces that are complementary to each respective interface identified in step 625 and insert the automatically generated interface(s) into the placeholder block. As noted, the system can automatically generate an HDL module with the appropriate signals being defined and automatically associate the HDL module with the placeholder block.

In step 640, the placeholder block can be output. For example, the placeholder block can be made available as a circuit block (an IP block) within a library of circuit blocks maintained by the system. Depending upon the preference of the circuit designer, the circuit design including the newly created placeholder block can be output.

Steps 645-670 represent optional steps that can be performed according to user specified preferences indicating whether adapter blocks, if available within the system, are desired within the circuit design. Accordingly, in step 645, the system can determine whether any adapter blocks are available for use within the placeholder block. The system can evaluate the interface(s) automatically generated for the placeholder block and identify any adapter blocks designed to couple to such interface(s). When no adapter blocks are available, the method can end.

When at least one adapter block is available, the method can continue to step 650, where an adapter block can be selected. When only one adapter block is available, the system can select that adapter block automatically. When more than one adapter block is available, the system can query the user to select a particular adapter block. In that case, the user-specified adapter block can be selected by the system for insertion into the placeholder block.

Continuing with step 655, the system can receive one or more user specified options for the adapter block. As noted, in the event that the adapter block is parameterizable, a configuration wizard can be displayed. The circuit designer can select various implementation options for the adapter block within the configuration wizard. In the event the adapter block has no user-selectable options, the method can bypass step 655 by proceeding directly from step 650 to step 660 as indicated by the dashed line.

In step 660, an instance of the adapter block can be added to the placeholder block. In step 665, a user block that implements a simplified interface that is complementary to the interface of the adapter block can be automatically generated. The user block is the block into which the circuit designer can insert user-specified circuitry. In step 670, the system can automatically couple the adapter block to the user block. In step 675, the system can output the placeholder block or the circuit design including the placeholder block.

Though not illustrated in FIG. 6, it should be appreciated that the system can further process the circuit design for implementation within an IC. For example, the circuit design can be mapped, placed, and routed for implementation within a selected target IC. The system then can convert the circuit design into configuration data that, when loaded into the IC, configures the IC with the circuit design. In other words, the circuit design, by virtue of loading the configuration data within the IC, is instantiated within the IC. One example of configuration data can include, but is not limited to, a bitstream that is loaded into configuration memory of an IC.

The flowchart in the figures illustrates the architecture, functionality, and operation of possible implementations of systems, methods and computer program products according to various embodiments of the present invention. In this regard, each block in the flowchart may represent a module, segment, or portion of code, which comprises one or more portions of executable program code that implements the specified logical function(s).

It should be noted that, in some alternative implementations, the functions noted in the blocks may occur out of the order noted in the figure. For example, two blocks shown in succession may, in fact, be executed substantially concurrently, or the blocks may sometimes be executed in the reverse order, depending upon the functionality involved. It also should be noted that each block of the flowchart illustration, and combinations of blocks in the flowchart illustration, can be implemented by special purpose hardware-based systems that perform the specified functions or acts, or combinations of special purpose hardware and executable instructions.

Embodiments of the present invention can be realized in hardware or a combination of hardware and software. The embodiments can be realized in a centralized fashion in one system or in a distributed fashion where different elements are spread across several interconnected systems. Any kind of data processing system or other apparatus adapted for carrying out the methods described herein is suited.

Embodiments of the present invention further can be embedded in a device such as a computer program product, which comprises all the features enabling the implementation of the methods described herein. The device can include a data storage device, e.g., a computer-usable or computer-readable device, storing program code that, when loaded and executed in a system comprising memory and a processor, causes the system to perform the functions, e.g., executable operations, described herein. Examples of data storage devices can include, but are not limited to, optical media, magnetic media, magneto-optical media, any of the memory elements disclosed herein such as random access memory or hard disk(s), or the like.

The terms "computer program," "software," "application," "computer-usable program code," "program code," "executable code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, program code can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

The embodiments disclosed herein can be embodied in other forms without departing from the spirit or essential attributes thereof. Accordingly, reference should be made to the following claims, rather than to the foregoing specification, as indicating the scope of the embodiments of the present invention.

What is claimed is:

1. Within a system comprising a processor and a memory, a method of creating a circuit design for implementation within an integrated circuit, the method comprising:

inserting a placeholder block into the circuit design, wherein the circuit design comprises at least one circuit block comprising circuitry and a circuit block interface, and wherein the placeholder block is devoid of circuitry;

responsive to receiving a user input specifying a coupling between the placeholder block and the at least one circuit block, automatically determining a plurality of attributes of the circuit block interface;

automatically generating, according to the attributes and by the processor, a placeholder interface within the placeholder block, wherein the placeholder interface is complementary to the circuit block interface; and storing the placeholder block within the memory, wherein automatically determining the plurality of attributes of the circuit block interface comprises determining ports of the circuit block interface.

2. The method of claim 1, further comprising determining a width of each port of the circuit block interface.

3. The method of claim 1, further comprising determining a directionality of each port of the circuit block interface.

4. The method of claim 1, wherein automatically generating, according to the attributes, the placeholder interface within the placeholder block comprises automatically generating a module declaration specifying each port of the placeholder interface, a direction of each port, and a width of each port.

5. Within a system comprising a processor and a memory, a method of creating a circuit design for implementation within an integrated circuit, the method comprising:

inserting a placeholder block into the circuit design, wherein the circuit design comprises at least one circuit block comprising circuitry and a circuit block interface, and wherein the placeholder block is devoid of circuitry;

responsive to receiving a user input specifying a coupling between the placeholder block and the at least one circuit block, automatically determining a plurality of attributes of the circuit block interface;

automatically generating, according to the attributes and by the processor, a placeholder interface within the placeholder block, wherein the placeholder interface is complementary to the circuit block interface;

automatically adding an instance of an adapter block within the placeholder block, wherein the adapter block comprises an adapter interface that is coupled to the placeholder interface;

generating a user block within the placeholder block, wherein the user block comprises an interface that is complementary to the adapter interface, wherein the user block is reserved for receiving user-specified circuitry;

coupling the adaptor block to the user block; and storing the placeholder block within the memory.

6. The method of claim 5, further comprising:

determining whether the adapter block comprises at least one user-specifiable implementation option; and when the adapter block comprises at least one user-specifiable implementation option, automatically displaying a configuration wizard that receives the at least one user-specifiable implementation option.

7. The method of claim 5, further comprising, prior to automatically adding the instance of the adapter block, determining whether the placeholder interface is compatible with an available adapter block.

8. The method of claim 7, further comprising, responsive to determining that the adapter block is available that is compatible with the placeholder interface, outputting a notification of the availability of the adapter block.

9. A system for creating a circuit design for implementation within an integrated circuit, the system comprising:

a memory storing program code; and a processor coupled to the memory, wherein the processor, upon executing the program code, performs operations comprising:

inserting a placeholder block into the circuit design, wherein the circuit design comprises at least one circuit block comprising circuitry and a circuit block interface, and wherein the placeholder block is devoid of circuitry;

responsive to receiving a user input specifying a coupling between the placeholder block and the at least one circuit block, automatically determining a plurality of attributes of the circuit block interface;

automatically generating, according to the attributes, a placeholder interface within the placeholder block, wherein the placeholder interface is complementary to the circuit block interface;

automatically adding an instance of an adapter block within the placeholder block, wherein the adapter block comprises an adapter interface that is coupled to the placeholder interface;

generating a user block within the placeholder block, wherein the user block comprises an interface that is complementary to the adapter interface, wherein the user block is reserved for receiving user-specified circuitry;

coupling the adaptor block to the user block; and storing the placeholder block within the memory.

10. The system of claim 9, wherein automatically generating, according to the attributes, the placeholder interface within the placeholder block comprises automatically generating a module declaration specifying each port of the placeholder interface, a direction of each port, and a width of each port.

11. A device, comprising:

a data storage device usable by a system comprising a processor and a memory, wherein the data storage device stores program code that, when executed by the system, causes the system to perform executable operations comprising:

inserting a placeholder block into a circuit design, wherein the circuit design comprises at least one circuit block comprising circuitry and a circuit block interface, and wherein the placeholder block is devoid of circuitry;

responsive to receiving a user input specifying a coupling between the placeholder block and the at least one circuit block, automatically determining a plurality of attributes of the circuit block interface;

automatically generating, according to the attributes and by the processor, a placeholder interface within the placeholder block, wherein the placeholder interface is complementary to the circuit block interface; and storing the placeholder block within the memory, wherein automatically determining a plurality of attributes of the circuit block interface comprises determining ports of the circuit block interface.

12. The device of claim 11, wherein automatically determining a plurality of attributes of the circuit block interface comprises determining a width of each port of the circuit block interface.

13. The device of claim 11, wherein the executable operations further comprise determining a directionality of each port of the circuit block interface.

14. The device of claim 11, wherein the executable operations further comprise automatically generating a module declaration specifying each port of the placeholder interface, a direction of each port, and a width of each port.

15. A device, comprising:

a data storage device usable by a system comprising a processor and a memory, wherein the data storage device stores program code that, when executed by the system, causes the system to perform executable operations comprising:

inserting a placeholder block into a circuit design, wherein the circuit design comprises at least one circuit block comprising circuitry and a circuit block interface, and wherein the placeholder block is devoid of circuitry;

responsive to receiving a user input specifying a coupling between the placeholder block and the at least one circuit block, automatically determining a plurality of attributes of the circuit block interface;

automatically generating, according to the attributes and by the processor, a placeholder interface within the placeholder block, wherein the placeholder interface is complementary to the circuit block interface;

storing the placeholder block within the memory;

automatically adding an instance of an adapter block within the placeholder block, wherein the adapter block comprises an adapter interface that is coupled to the placeholder interface;

generating a user block within the placeholder block, wherein the user block comprises an interface that is complementary to the adapter interface, wherein the user block is reserved for receiving user-specified circuitry; and coupling the adaptor block to the user block.

16. The device of claim 15, wherein the executable operations further comprise, prior to automatically adding the instance of the adapter block, determining whether the placeholder interface is compatible with an available adapter block.

17. The device of claim 16, wherein the executable operations further comprise, responsive to determining that an adapter block is available that is compatible with the placeholder interface, outputting a notification of the availability of the adapter block.

* * * * *